(12) United States Patent
Umetsu et al.

(10) Patent No.: US 8,179,101 B2
(45) Date of Patent: May 15, 2012

(54) CHARGING APPARATUS

(75) Inventors: Koji Umetsu, Miyagi (JP); Keiji Tsuchiya, Miyagi (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/576,013

(22) Filed: Oct. 8, 2009

(65) Prior Publication Data
US 2010/0090647 A1    Apr. 15, 2010

(30) Foreign Application Priority Data

Oct. 9, 2008    (JP) ................. P2008-262400

(51) Int. Cl.
*H01M 10/46*    (2006.01)
(52) U.S. Cl. ...................................... 320/152
(58) Field of Classification Search .................. 320/112, 320/116, 134, 138, 152, 157, 164
See application file for complete search history.

(56) References Cited

U.S. PATENT DOCUMENTS

| | | | | |
|---|---|---|---|---|
| 2006/0028178 | A1* | 2/2006 | Hobbs ........................... | 320/128 |
| 2007/0103118 | A1* | 5/2007 | Takagi et al. ................ | 320/130 |

FOREIGN PATENT DOCUMENTS

| | | |
|---|---|---|
| JP | 6014473 | 1/1994 |
| JP | HEI 06-014473 | 1/1994 |
| JP | HEI 06-133465 | 5/1994 |
| JP | HEI 06-233468 | 8/1994 |
| JP | HEI 09-050826 | 2/1997 |
| JP | HEI 10-032938 | 2/1998 |
| JP | 2002-152984 | 5/2002 |
| JP | 2003-217681 | 7/2003 |
| JP | 2007-020299 | 1/2007 |
| JP | 2007020299 | 1/2007 |
| JP | 2007-215081 | 8/2007 |

OTHER PUBLICATIONS

Japanese Office Action issued on Aug. 17, 2010 corresponding to Japanese Patent Appln. No. 2008-262400.

* cited by examiner

*Primary Examiner* — Edward Tso
(74) *Attorney, Agent, or Firm* — K&L Gates LLP

(57) ABSTRACT

A charging apparatus includes a power supply circuit converting AC input into DC output, a secondary battery, having a plurality of batteries connected in series, which is charged by an output voltage of the power supply circuit, a charging control circuit that controls charging in a constant-current mode for charging the secondary battery with a constant current and, when a terminal voltage of the secondary battery reaches a predetermined voltage, switches the charging in the constant-current mode to a constant-voltage mode for charging the secondary battery to a constant voltage, and a plurality of voltage control circuits, each of which adjusts the voltage of each of the plurality of batteries to a set voltage. The plurality of voltage control circuits respectively detect voltage rises of the plurality of batteries, and one of the voltage control circuits, first detecting attainment of the set voltage, performs subsequent voltage control.

5 Claims, 6 Drawing Sheets

CHARGING APPARATUS

CROSS REFERENCES TO RELATED APPLICATIONS

The present application claims priority to Japanese Priority Patent Application JP 2008-262400 filed in the Japan Patent Office on Oct. 9, 2008, the entire content of which is hereby incorporated by reference.

BACKGROUND

The present invention relates to a charging apparatus for charging, for example, a battery pack.

There has been a charging apparatus for charging a secondary battery using DC voltage converted by a switching power supply from commercial power. A specific example of a secondary battery is a battery pack including batteries (called cells) connected in series and covered by an insulating outer case. For a lithium ion secondary battery, the battery pack is charged by a constant-current/constant-voltage (CC/CV) charging method, in which constant-current charging and constant-voltage charging are combined. An example of a charging apparatus of this type is described in Japanese Unexamined Patent Application Publication No. 2007-20299.

The charging apparatus described in Japanese Unexamined Patent Application Publication No. 2007-20299 has two error amplifiers (operational amplifiers): one for comparing the output voltage with a reference voltage and the other for comparing the voltage corresponding to a charging current with the reference voltage. The comparison outputs from the error amplifiers are supplied to a pulse width modulation control circuit, where output control is performed.

SUMMARY

The charging apparatus described in Japanese Unexamined Patent Application Publication No. 2007-20299 compares the output voltage of the entire battery pack with the reference voltage to control the output voltage, and does not detect the voltage of each battery. To charge each battery safely, however, the upper voltage limit set for each battery should not be exceeded. Otherwise, the cycle charging life of each battery may be reduced significantly or, in a worst-case scenario, a gas may be generated from the battery. In addition, if a voltage or capacity difference occurs between batteries after their service life has elapsed, the voltage balance between the batteries may be lost. Some battery packs of this type may have been charged to a voltage higher than the upper voltage limit of a battery.

Therefore, the output voltage of the charging apparatus has been adjusted accurately or suppressed to a low value to prevent the upper voltage limit from being exceeded. Accurate adjustment of the output voltage of the charging apparatus causes an increase in cost. In addition, a protection circuit is provided to stop charging if the voltage of any of batteries exceeds the upper voltage limit. However, such a protection circuit operates on a battery with the highest voltage in a battery pack in which the voltage balance is lost, significantly reducing the service life of the battery pack.

It is desirable to provide a charging apparatus that addresses the above problems and satisfactorily charges a secondary battery including a plurality of batteries connected in series.

According to an embodiment, there is provided a charging apparatus including a power supply circuit for converting alternating current input into direct current output, a secondary battery including a plurality of batteries connected in series, the secondary battery being charged by an output voltage of the power supply circuit, a charging control circuit that controls charging in a constant-current charging mode for charging the secondary battery with a constant current and, when a terminal voltage of the secondary battery reaches a predetermined voltage, switches the charging in the constant-current charging mode to charging in a constant-voltage charging mode for charging the secondary battery to a constant voltage, and a plurality of voltage control circuits, each adjusting a voltage of each of the plurality of batteries to a set voltage. The plurality of voltage control circuits respectively detect rises in voltages of the plurality of batteries, and one of the voltage control circuits, first detecting attainment of the set voltage, performs subsequent voltage control.

Preferably, the charging apparatus is arranged so that voltages of the plurality of batteries are supplied to a plurality of voltage comparators through bidirectional switches that turn on during charging operation and turn off during non-charging operation, reference voltages are supplied to the plurality of voltage comparators respectively, a comparison output from one of the plurality of voltage comparators is supplied to the power supply circuit as an output voltage control signal, and the voltages of the plurality of batteries are adjusted to values according to the reference voltages.

Preferably, each of the bidirectional switches includes a first field-effect transistor (FET) and a second field-effect transistor, which are connected in series.

Preferably, output signals from the plurality of voltage control circuits are supplied to a photodiode of a photocoupler through diodes.

Preferably, the secondary battery is a battery pack including a plurality of batteries connected in series and an insulating outer case covering the batteries.

According to an embodiment, the following effects can be obtained.

1. The voltage balance between a plurality of batteries may be lost depending on variations between voltages of the batteries or a charge/discharge cycle. In such a case, each of the batteries may be charged to a voltage higher than the upper charging voltage limit of the battery. According to the embodiment of the present invention, charging with a voltage equal to or lower than the upper voltage limit can be surely performed. This ensures safe charging of batteries and is effective in keeping their cycle life.

2. In a charging apparatus of related art, a protection circuit may be provided to stop charging when voltages of batteries reach the upper voltage limit, with the above unbalance between batteries taken into account. In this case, the protection circuit operates to stop charging in the middle thereof, resulting in insufficient charging. The service life of a battery pack may then be reduced significantly. According to the embodiment of the present invention, such a problem can be addressed.

3. According to the embodiment, any protection circuit is not used because the voltages of batteries can be surely adjusted to a value equal to or lower than the upper voltage limit. This prevents a rise in cost due to the addition of a protection circuit.

4. In the related art, batteries with the same capacity are connected in series so that the above unbalance between batteries is not caused. However, according to the embodiment of the present invention, requests for the same capacity can be eased.

Additional features and advantages are described herein, and will be apparent from the following Detailed Description and the figures.

DETAILED DESCRIPTION

Figure 1:
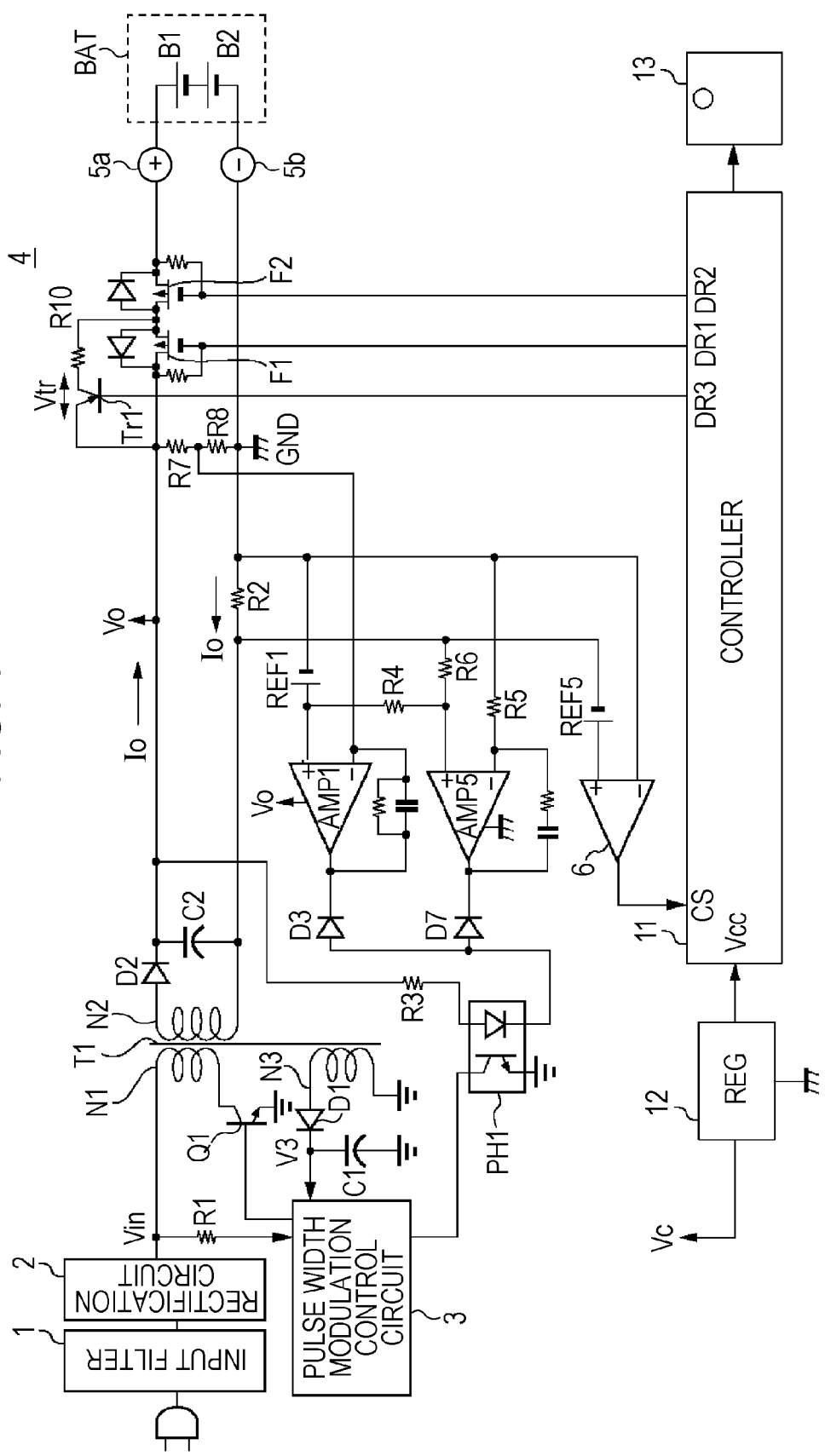
FIG. 1 is a connection diagram illustrating an exemplary charging apparatus of an embodiment.

The present application will be described below with reference to the figures according to an embodiment.

1. Charging apparatus to which the embodiments are applicable
2. Embodiment of the present invention
3. Another embodiment of the present invention
4. Modification

1. CHARGING APPARATUS TO WHICH THE EMBODIMENTS ARE APPLICABLE

To help understand an embodiment of the present invention, the charging apparatus proposed previously in Japanese Patent No. 3430264 (Japanese Unexamined Patent Application Publication No. 6-14473) by one of the inventors of the present invention and other inventors will now be described below with reference to FIG. 1. This charging apparatus charges a battery pack BAT by the constant-current/constant-voltage (CC/CV) charging method, in which constant-current charging and constant-voltage charging are combined.

Commercial alternating current (AC) power is converted by an input filter 1 and a rectification circuit 2 into direct current (DC) power. A pulse width modulation control circuit 3, a transistor Q1, and a transformer T1 constitute a switching power supply. The transistor Q1 as a switching device performs switching operation at, for example, 100 kHz according to an output pulse from the pulse width modulation control circuit 3. The rectified output of a diode D1 and a capacitor C1, which are connected to a tertiary winding N3 of the transformer T1, is supplied to the pulse width modulation control circuit 3 as a power supply.

Current flowing through a primary winding N1 is controlled by the transistor Q1 and power is induced in a secondary winding N2 and the tertiary winding N3. Voltage induced in the secondary winding N2 is rectified by a diode D2 and a capacitor C2 to obtain rectified output Vo. The rectified output Vo is extracted from output terminals 5a (positive side) and 5b (negative side) through a switch unit 4, which includes a metal oxide semiconductor field-effect transistor (MOSFET) F1, a MOSFET F2, a transistor Tr1, and other components. The battery pack BAT is connected between the output terminals 5a and 5b. The battery pack BAT includes secondary batteries such as lithium ion secondary batteries B1 and B2 connected in series and an insulating outer case integrating those batteries. The FETs F1 and F2 function as switches that turn on or off charging.

The rectified output Vo is subjected to voltage division by resistors R7 and R8 and input to the negative terminal of an operational amplifier AMP1. A reference voltage REF1 is input to the positive terminal of the operational amplifier AMP1 and compared with the output voltage Vo (voltage subjected to voltage division by the resistors R7 and R8). The operational amplifier AMP1 supplies a signal indicating the error between the output voltage Vo and the reference voltage REF1 to a photocoupler PH1 through a diode D3. The operational amplifier AMP1 outputs a negative output (difference) signal when the divided voltage is higher than the reference voltage REF1.

The error signal transferred from the secondary side to the primary side of the photocoupler PH1 is supplied to the pulse width modulation control circuit 3. The pulse width modulation control circuit 3 controls power to be output to the secondary side by controlling the ON period of an output pulse of the transistor Q1, so that the output voltage set by the reference voltage on the secondary side is extracted. For example, when the output voltage is higher than a set voltage of, for example, 8.4 V, an output current corresponding to the difference between two input voltages flows through the output terminal of the operational amplifier AMP1. The output current flows through the diode D3 and is supplied to the pulse width modulation control circuit 3 through the photocoupler PH1. The pulse width modulation control circuit 3 makes control so that the duty ratio of the pulse signal and the output voltage Vo are reduced. The output voltage Vo is adjusted to a set voltage in this way.

In addition, an output (charging) current Io is detected by a resistor R2. The load side (output side) terminal of the resistor R2 is connected to the negative terminal of an operational amplifier AMP5 through a resistor R5. The positive terminal of the operational amplifier AMP5 is supplied with the voltage obtained by dividing the reference voltage REF1 by resistors R4 and R6.

The operational amplifier AMP5 compares the voltage corresponding to the output current Io with the reference voltage and supplies a resulting output current to the photocoupler PH1 through a diode D7. The operational amplifiers AMP1 and AMP5 supply the output signal H (high) when the input voltage of the positive terminal is higher than the input voltage of the negative terminal. In this case, no output current flows through the diodes D3 and D7. The operational amplifiers AMP1 and AMP5 supply the output signal L (low) when the input voltage of the negative terminal is higher than the input voltage of the positive terminal. In this case, an output current flows through the diodes D3 and D7.

The output signal of the operational amplifier AMP5 is supplied to the pulse width modulation control circuit 3 through the diode D7 and the photocoupler PH1 and, as in voltage control, the pulse width modulation control circuit 3 on the primary side performs current control. That is, the voltage difference between the positive and negative terminals of the operational amplifier AMP5 increases with the amount of current flowing through the resistor R2; the amount of output current is controlled so that the voltage across the resistor R2 becomes constant.

A predetermined voltage resulting from the stabilization of the output voltage Vo by a regulator 12 is supplied to a controller 11 as power voltage. In addition, an LED 13 indicating the charging status is connected as an display unit to the controller 11. The controller 11, which controls charging, includes a microcomputer.

The switch unit 4 is driven by drive pulse signals DR1, DR2, and DR3 output from the controller 11. When the controller 11 detects the attachment of the battery pack BAT to the changing apparatus by an output signal from a detection switch (not shown), the controller 11 starts and continues predetermined charging while monitoring the battery voltage. Since a parasitic diode is present in an FET, to prevent discharge through the parasitic diode, the two FETs F1 and F2 are provided.

If the battery voltage is very low as in an over discharge state, the switch unit 4 having the FETs F1 and F2 is turned off so that a small amount of charging current flows through the transistor Tr1 and a resistor R10. When the battery voltage is, for example, 4.5 V or less, a small amount of charging current is supplied to the battery pack BAT.

Figure 2:
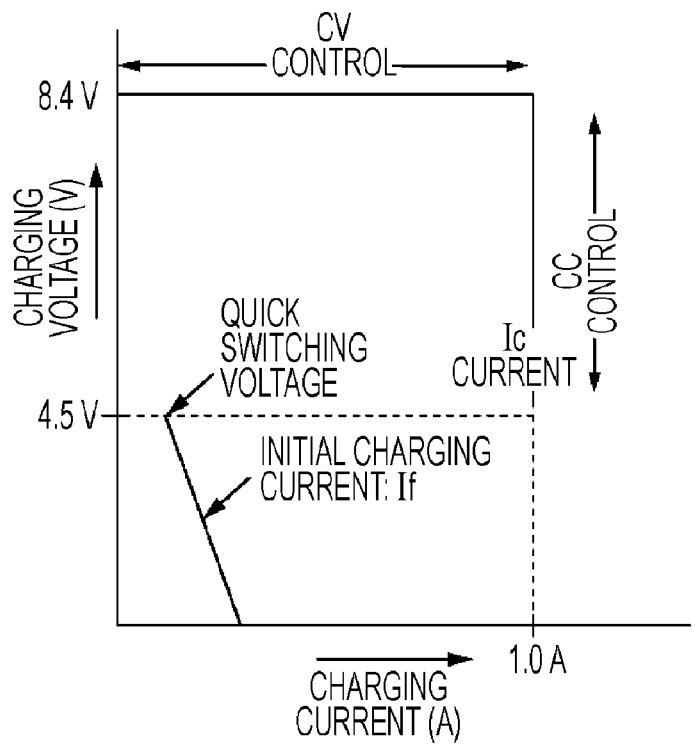
FIG. 2 is a line chart illustrating the output characteristic of an exemplary charging apparatus.

The charging apparatus described above charges the batteries B1 and B2 connected in series by the constant-current/constant-voltage (CC/CV) charging method. FIG. 2 shows the output characteristic of the above charging apparatus. Charging current is plotted on the horizontal axis and charging voltage is plotted on the vertical axis. This charging apparatus first controls constant-current (CC) charging. In the section of constant-current charging, the output current is fixed to, for example, 1.0 A by the output current of the operational amplifier AMP5. Next, the charging apparatus controls constant-voltage (CV) charging, so that the output voltage is kept constant. The output voltage is fixed to, for example, 8.4 V by the output current from the operational amplifier AMP1. In general, if the number of batteries connected in series is N, the batteries are charged with an output voltage of N×4.2 V. In an initial charging mode, which is at an early stage of charging, charging is performed with an initial charging current If. When the battery voltage reaches a quick switching voltage of, for example, 4.5 V, a shift to a quick charging mode occurs.

Initial charging current $If=(Vo-Vtr)/R10$ (see FIG. 1)

Figure 3:
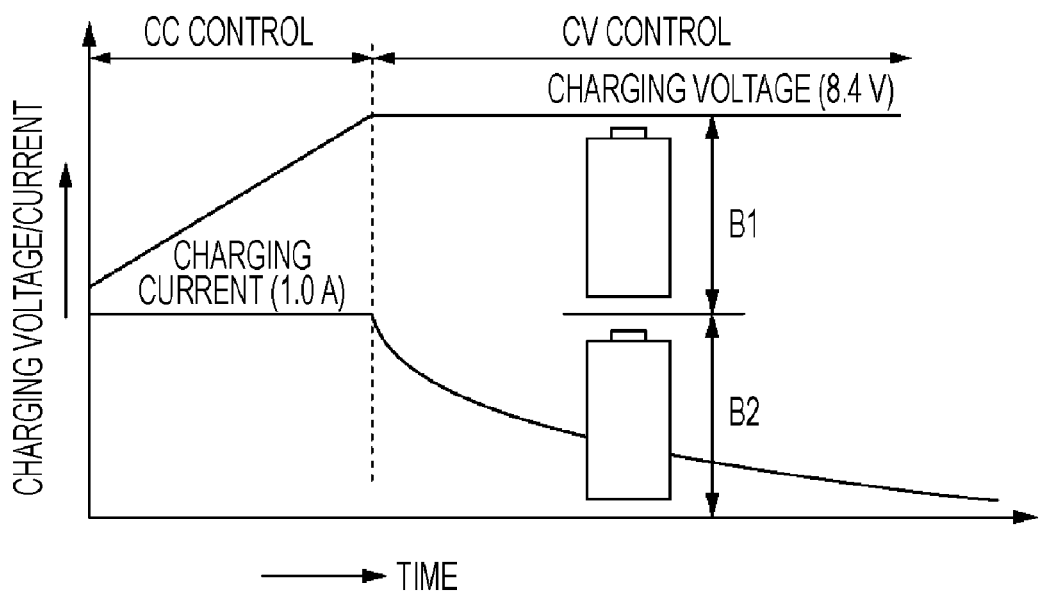
FIG. 3 is a line chart illustrating changes in voltage and current when an exemplary charging apparatus performs charging.

FIG. 3 shows changes in the charging voltage and charging current (charging curves) over time during charging. For example, in the section where the battery voltage is equal to or lower than a set voltage (for example, 8.4 V), constant-current charging is performed with a constant current (for example, 1.0 A) under constant-current charging control. When the battery voltage (internal electromotive force) reaches 8.4 V as charging progresses, a shift to constant-voltage charging control occurs and the charging current is reduced gradually. When it is detected that the charging current has reached a set charging completion detection value, charging is detected to be completed.

In the structure shown in FIG. 1, during constant-current charging, the output of the operational amplifier AMP5 is supplied to the photocoupler PH1 through the diode D7 to control the power supply so that the output current is kept constant. In constant-current charging, since the output of the operational amplifier AMP5 is lower than the output of the operational amplifier AMP1, the output of the operational amplifier AMP5 is used to control the power supply. During constant-voltage charging, the output of the operational amplifier AMP1 is supplied to the photocoupler PH1 through the diode D3 to control the power supply so that the output voltage Vo is adjusted to a predetermined voltage based on the output of the operational amplifier AMP1. In constant-voltage charging, since the output of the operational amplifier AMP1 is lower than the output of the operational amplifier AMP5, the output of the operational amplifier AMP1 is used to control the power supply.

In the structure shown in FIG. 1, one end on the load side of current detection resistor R2 is connected to the negative terminal of a comparator 6 and the other end is connected to the negative side of a reference voltage REFS, and the positive side of the reference voltage REFS is connected to the positive terminal of the comparator 6. The charge current is converted into a voltage by the resistor R2 and the voltage is compared with the reference voltage REFS. When the charge current is reduced, the reference voltage of the positive terminal of the comparator 6 becomes higher than at the negative terminal, thereby reversing the polarity of the output Cs of the comparator 6. The output Cs of the comparator 6 is supplied to the controller 11 and the controller 11 detects the completion of charging. When charging stops, all the transistors and FETs of the switch unit 4 are turned off.

The charging apparatus with the structure shown in FIG. 1 adjusts the voltage of batteries B1 and B2 connected in series in the battery pack BAT to 8.4 V. Therefore, the voltage of each battery may not be surely adjusted to an upper voltage limit of, for example, 4.2 V or less. As a result, as described above, a voltage higher than the upper voltage limit may be applied to each battery, the cycle life of the battery may be significantly reduced and, in a worst-case scenario, gas may be generated from the battery. In particular, when a capacity difference occurs between batteries after their service life has elapsed, a voltage balance between batteries may be lost. Such a battery pack may be charged with a voltage higher than the upper voltage limit of each battery.

2. EMBODIMENT OF THE PRESENT APPLICATION

Figure 4:
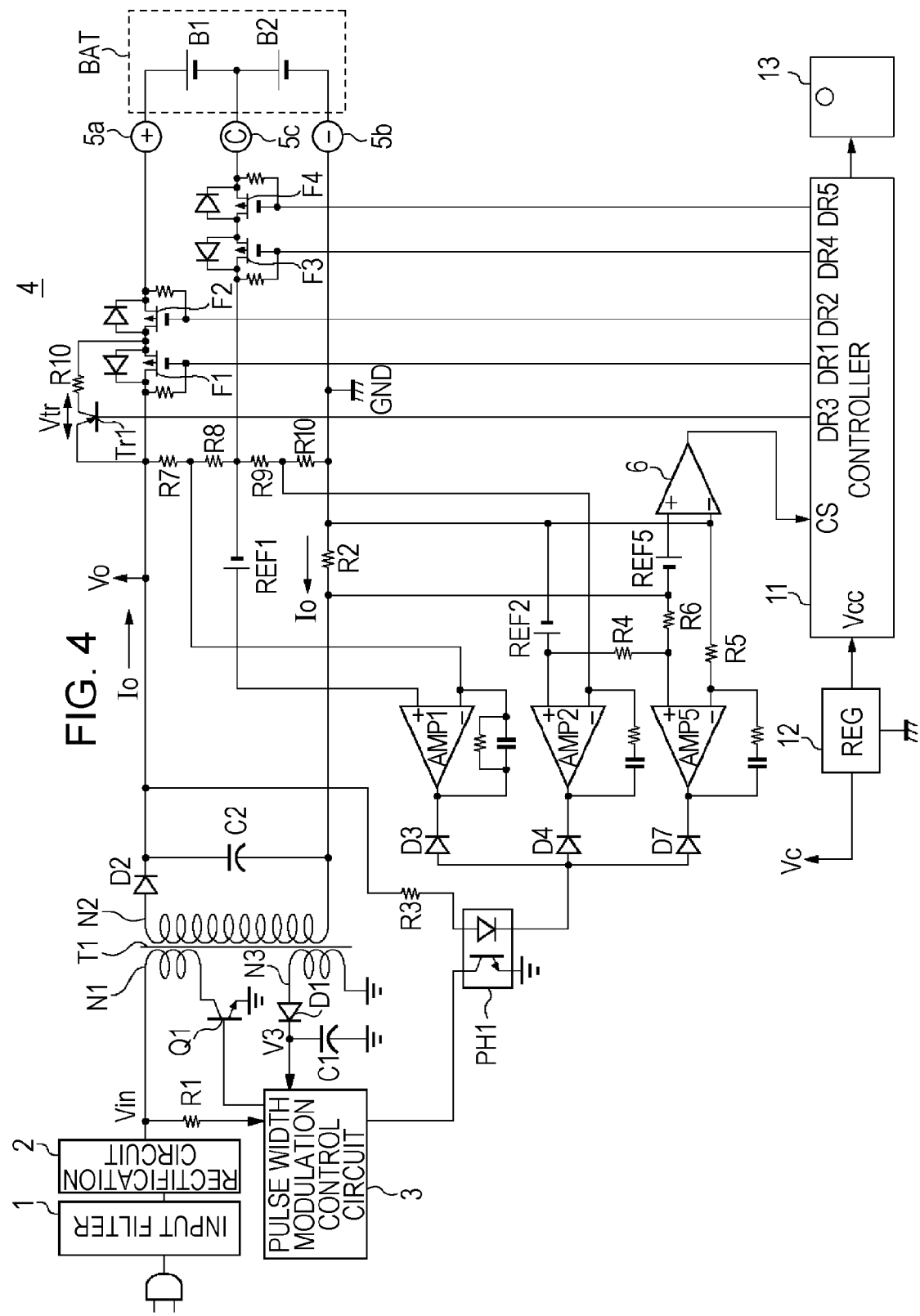
FIG. 4 is a connection diagram of a charging apparatus according to an embodiment.

An embodiment of the present application for addressing this problem will be described below with reference to FIG. 4. The charging apparatus in FIG. 4, which has a structure obtained by improving the charging apparatus of the related art shown in FIG. 1, charges a battery pack BAT by the CC/CV charging method, in which constant-current charging and constant-voltage charging are combined.

The battery pack BAT has secondary batteries such as lithium ion secondary batteries B1 and B2 connected in series. One output terminal 5a of the charging apparatus is connected to the positive side terminal (positive electrode of the battery B1) of the battery pack BAT and the other output terminal 5b of the charging apparatus is connected to the negative side terminal (negative electrode of the battery B2) of the battery pack BAT. The connection point between the batteries B1 and B2 is a terminal 5c. The voltage of the battery B1 is indicated by the voltage between the output terminals 5a and 5c. The voltage of the battery B2 is indicated by the voltage between the output terminals 5b and 5c. As described later, in the embodiment of the present invention, the voltages of the batteries are controlled separately.

When commercial AC power passes through an input filter 1 and a rectification circuit 2, a DC voltage Vin is generated. A switching device Q1 switches current flowing through a primary winding N1 of a transformer T1 at a predetermined frequency of, for example, 100 kHz. Power is induced in a secondary winding N2 and a tertiary winding N3 of the transformer T1. The voltage induced in the secondary winding N2 is rectified by a diode D2 and a capacitor C2 and an output voltage Vo is generated.

This output voltage Vo is extracted from the output terminal 5a through MOSFETs F1 and F2 of a switch unit 4. The FETs F1 and F2 are driven by drive pulse signals DR1 and DR2 output from a controller 11. The FETs F1 and F2 constitute a bidirectional switch. The FETs F1 and F2 turn on during charging.

The output voltage Vo is divided by resistors R7, R8, R9, and R10 connected in series. The connection point between the resistors R8 and R9 of this resistor voltage divider is connected to the output terminal 5c through MOSFETs F3 and F4. The FETs F3 and F4 are driven by drive pulse signals DR4 and DR5 output from the controller 11. The FETs F3 and F4 constitute a bidirectional switch for detecting battery voltage. The FETs F3 and F4 turn on during charging.

The voltages of the batteries B1 and B2 are controlled by operational amplifiers AMP1 and AMP2, respectively. The operational amplifier AMP1 controls the voltage of the battery B1 and the operational amplifier AMP2 controls the voltage of the battery B2. When the FETs of the switch unit 4 turn on, the voltage of the battery B1 is applied across the series circuit including the resistors R7 and R8 and the voltage of the battery B2 is applied across the series circuit including the resistors R9 and R10.

The voltage of the connection point between the resistors R7 and R8 is supplied to the negative terminal of the operational amplifier AMP1. The connection point between the resistors R8 and R9 is connected to the negative pole of a reference voltage REF1 and the positive pole of the reference voltage REF1 is connected to the positive terminal of the operational amplifier AMP1. A voltage difference signal corresponding the difference between the voltages applied to the input terminals of the operational amplifier AMP1 is obtained from the output. This voltage difference signal is supplied to the cathode of a diode D3.

The voltage of the connection point between the resistors R9 and R10 is supplied to the negative terminal of the operational amplifier AMP2. The negative side power line (grounding line) and the negative pole of a reference voltage REF2 are mutually connected and the positive pole of the reference voltage REF2 is connected to the positive terminal of the operational amplifier AMP2. A voltage difference signal corresponding the difference between the voltages applied to the input terminals of the operational amplifier AMP2 is obtained from the output. The difference signal is supplied to the cathode of a diode D4.

The anodes of the diodes D3 and D4 are mutually connected and this common connection point is connected to the cathode of the photodiode of a photocoupler PH1. The anode of the photodiode is connected to a power line in which the output voltage Vo is to be generated, through a resistor R3. The photodiode emits light in response to the input current and the phototransistor produces output current. The difference signal extracted from the phototransistor of the photocoupler PH1 is supplied to a pulse width modulation control circuit 3. This difference signal controls the duty ratio of a pulse signal output from the pulse width modulation control circuit 3 so that the output voltage equals a predetermined voltage. For example, when the output voltage Vo is higher than the set voltage, current flows through the photodiode of the photocoupler PH1 to narrow the width of an output pulse of the pulse width modulation control circuit 3, thereby lowering the output voltage.

An output (charging) current Io is detected by a resistor R2. The terminal on the load side (output side) of a resistor R2 is connected to the negative terminal of an operational amplifier AMP5 through a resistor R5. The positive terminal of the operational amplifier AMP5 is supplied with the reference voltage obtained by dividing the reference voltage REF2 by resistors R4 and R6 to raise the voltage of the positive terminal of the operational amplifier AMP5.

The output current Io flowing through the resistor R2 causes a voltage drop. The operational amplifier AMP5 outputs the current corresponding to the difference between the reference voltage and the voltage lowered by the voltage drop at the resistor R2. When the voltage of the positive terminal of the operational amplifier AMP5 is equal to or lower than the voltage of the negative terminal thereof, the output signal level of the operational amplifier AMP5 changes from high to low.

The output signal of the operational amplifier AMP5 is supplied to the pulse width modulation control circuit 3 through a diode D7 and the photocoupler PH1 and current control is performed by the pulse width modulation control circuit 3 on the primary side. That is, the voltage of the negative terminal of the operational amplifier AMP5 is compared with that of the positive terminal at which a voltage drop was caused by current flowing through the resistor R2 and the output current is controlled so that the voltage generated across the resistor R2 is kept constant. The output current is fixed in this way. In current control, as in the structure shown in FIG. 1, current flowing through the battery pack BAT is controlled. That is, unlike voltage control, the same amount of current flows through the batteries B1 and B2 connected in series, so it is not necessary to control current for each battery.

When charging is not performed, all the FETs and a transistor Tr1 of the switch unit 4 are turned off. In this case, the operational amplifier AMP1 controls the output voltage so that the voltage across the resistors R7 and R8 becomes a predetermined value. That is, the operational amplifier AMP2 controls the output voltage so that the voltage across the resistors R9 and R10 becomes a predetermined value.

If the battery voltage is very low, the switch unit 4 including the FETs F1 and F2 is turned off so that a small charge current flows through the transistor Tr1 that is turned on and the resistor R10. When the battery voltage is, for example, 4.5 V or lower, a small charge current is supplied to the battery pack BAT.

Figure 5:
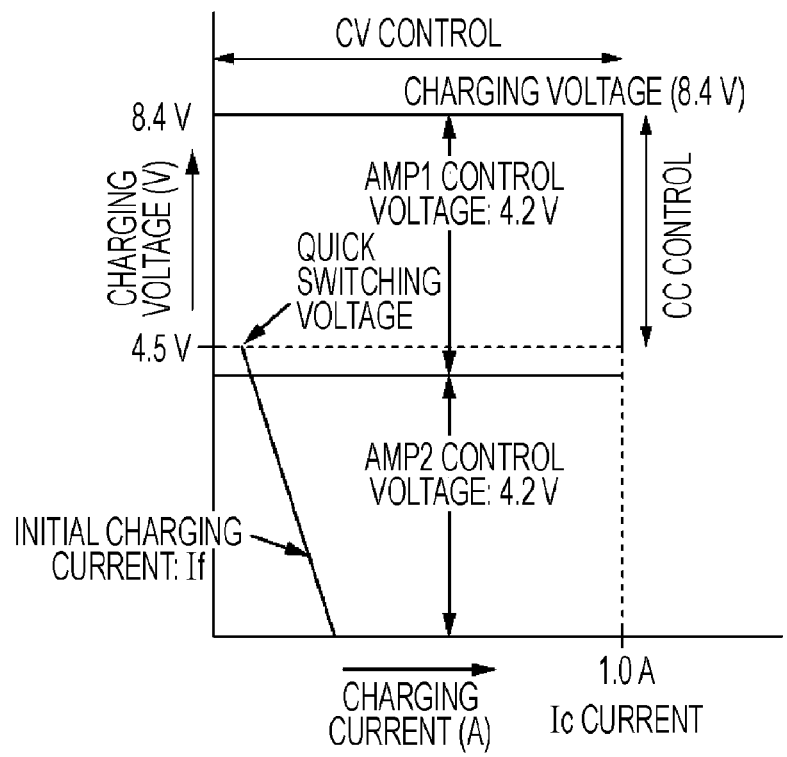
FIG. 5 is a line chart illustrating the output characteristic of a charging apparatus according to the embodiment of the present invention.
Figure 6:
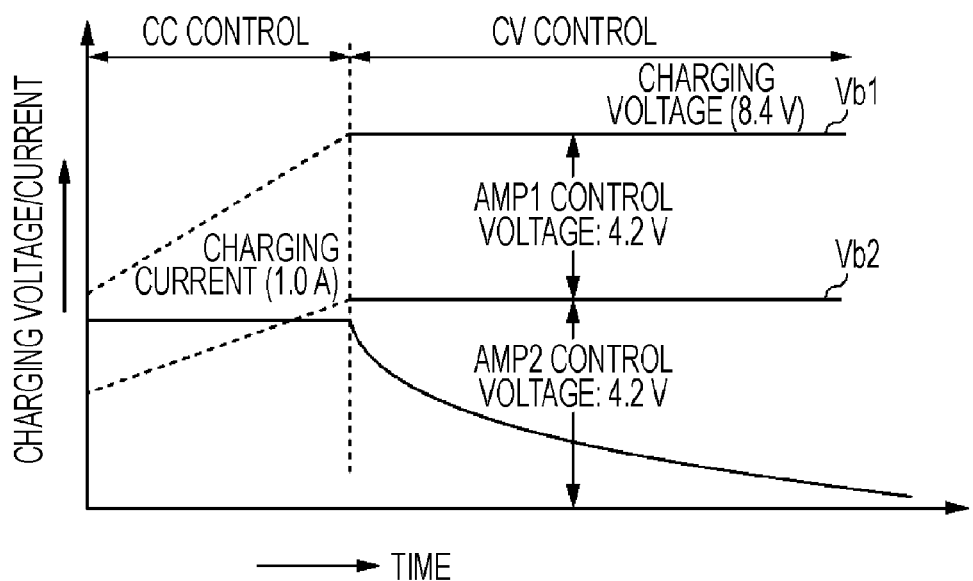
FIG. 6 is a line chart illustrating changes in voltage and current when a charging apparatus according to an embodiment.

As described above, the related art includes one voltage control amplifier to control the output voltage Vo of a charging apparatus, but the embodiment of the present invention includes a plurality of amplifiers, each of which controls the voltage of a battery. FIG. 5 shows the output characteristic of a charging apparatus according to an embodiment. Charging current is plotted on the horizontal axis and charging voltage is plotted on the vertical axis. In this example, the voltage applied to each battery is adjusted to 4.2 V. In FIG. 6, the characteristic of one battery B1 is indicated as Vb1 and the characteristic of the other battery B2 is indicated as Vb2.

The charging apparatus uses the CC/CS charging method to charge the batteries B1 and B2 connected in series. The charging apparatus controls constant-current (CC) charging with a constant current of, for example, 1.0 A after initial charging. In an initial charging mode, which is at an early stage of charging, charging is performed with an initial charging current If. In the section of constant-current charging, the output current is fixed to, for example, 1.0 A by the output current from the operational amplifier AMP5. The battery voltage (internal electromotive force) rises as charging progresses. The voltages of the batteries are compared with the reference voltages by the operational amplifiers AMP1 and AMP2. The operational amplifiers AMP1 and AMP2 generate high outputs and thereby prevent output current from flowing, in the low-constant current charging section where the battery voltage is lower than the reference voltage.

Next, when the voltage of one of the batteries B1 and B2 reaches 4.2 V, the magnitude relationship between two input voltages of the operational amplifier connected to the battery is reversed and the low level is output and an output current is generated. After that, constant-voltage (CV) charging control is performed. In the embodiment of the present invention, as described above, a plurality of operational amplifiers respectively detect rises in voltage as constant-voltage control circuits. The operational amplifier that first detects the attainment of a set voltage of, for example, 4.2 V in the constant-voltage control controls the output voltage of the charging apparatus.

In the constant-voltage (CV) charging control, the operational amplifier AMP1 controls the voltage of the battery B1 and the operational amplifier AMP2 controls the voltage of the battery B2. It is assumed here that the balance between the voltages of the batteries B1 and B2 is lost. If the voltage of the battery B2 is higher than that of the battery B1, when the battery voltage of the battery B2 first reaches 4.2 V as charging progresses, the output of the operational amplifier AMP2 goes low. The output of the operational amplifier AMP1 remains high. Therefore, the output current of the operational amplifier AMP2 is fed back to the pulse width modulation control circuit 3 through the photocoupler PH1 and the battery voltage of the battery B2 is adjusted to 4.2 V.

The charging apparatus adjusts the battery voltage of the battery B2 to a constant voltage of 4.2 V in this way to prevent charging with a higher voltage (above the upper voltage limit). Since the battery voltage of the battery B1 does not reach 4.2 V yet, as a result of control of the voltage of the battery B2, the charging voltage of the battery B1 is surely adjusted to 4.2 V or lower to prevent the battery B1 from being charged with a voltage higher than the upper voltage limit.

FIG. 6 shows changes in charging voltage and charging current (charging curves) over time during charging. In the section where the battery voltage is equal to or lower than the constant voltage charging control voltage (sum of the battery voltages of the batteries B1 and B2, for example, 8.4 V), constant-current charging is performed with a constant current such as 1.0 A. When the battery voltage (internal electromotive force) of one battery reaches 4.2 V due to a rise in the battery voltage during charging, the operation of the charging apparatus switches to constant voltage charging control operation, reducing the charging current gradually. When a comparator 6 detects that the charging current has reached a set charging completion detection value, the comparator 6 determines the completion of charging and stops charging.

As described above, the exemplary circuit of the present embodiment controls the voltage of each of batteries to achieve voltage control in which a upper voltage limit of, for example, 4.25 V is not exceeded even if the balance between the voltages of the batteries is lost.

3. ANOTHER EMBODIMENT OF THE PRESENT APPLICATION

Figure 7:
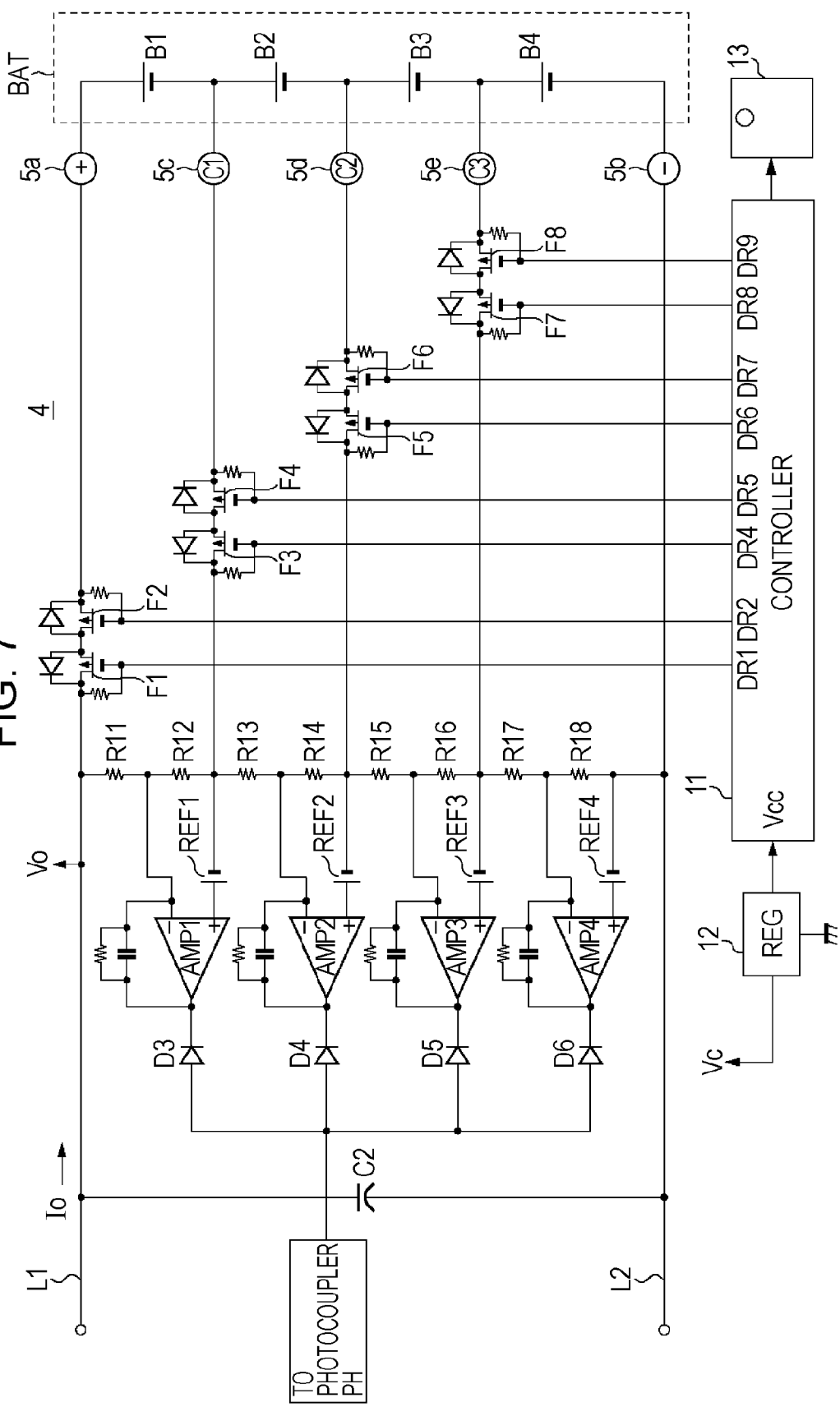
FIG. 7 is a connection diagram of a charging apparatus according to another embodiment.

FIG. 7 shows another embodiment applied to a charging apparatus for a battery pack BAT having batteries B1, B2, B3, and B4 connected in series. For simplicity, this figure shows only a part for controlling the voltage of each battery.

The battery pack BAT is connected between a positive power line L1 and a negative power line L2, from which an output voltage Vo is extracted, through FETs F1 and F2 of a switch unit 4. Resistors R11, R12, R13, R14, R15, R16, R17, and R18 connected in series are inserted between the power lines L1 and L2. One end of the battery pack BAT is connected to an output terminal 5a of the charging apparatus and the other end is connected to an output terminal 5b of the charging apparatus. The connection point between the battery B1 and the battery B2 is an output terminal 5c, and the connection point between the battery B2 and the battery B3 is an output terminal 5d, and the connection point between the battery B3 and the battery B4 is an output terminal 5e.

A controller 11 supplies drive pulse signals DR1 and DR2 to the gates of the FETs F1 and F2 of the switch unit 4 to turn on the FETs F1 and F2 during quick charging. The connection point between the resistors R11 and R12 is connected to the negative side input terminal of an operational amplifier AMP1 and the connection point between the resistors R12 and R13 is connected to the negative side of a reference voltage REF1. The positive side of the reference voltage REF1 is connected to the positive side input terminal of the operational amplifier AMP1. The output terminal of the operational amplifier AMP1 is connected to the cathode of a diode D3. The operational amplifier AMP1 outputs the difference between the voltage of the battery B1 and the reference voltage REF1.

The connection point between the resistors R12 and R13 is connected to the output terminal 5c through a bidirectional switch including FETs F3 and F4. The controller 11 supplies drive pulse signals DR4 and DR5 to the gates of the FETs F3 and F4 to turn on the FETs F3 and F4 during quick charging. The connection point between the resistors R13 and R14 is connected to the negative side input terminal of an operational amplifier AMP2 and the connection point between the resistors R14 and R15 is connected to the negative side of a reference voltage REF2. The positive side of the reference voltage REF2 is connected to the positive side input terminal of the operational amplifier AMP2. The output terminal of the operational amplifier AMP2 is connected to the cathode of a diode D4. The operational amplifier AMP2 outputs the difference between the voltage of the battery B2 and the reference voltage REF1.

For the battery B3, as in the batteries B1 and B2, a bidirectional switch including FETs F5 and F6, which are turned on by drive pulse signals D6 and D7 during quick charging, a reference voltage REF3, and an operational amplifier AMP3 for comparing voltages are provided. The output signal of the operational amplifier AMP3 is supplied to the cathode of a diode D5. For the battery B4, a bidirectional switch including FETs F7 and F8, which are turned on by drive pulse signals D8 and D9 during quick charging, a reference voltage REF4, and an operational amplifier AMP4 for comparing voltages are provided. The output signal of the operational amplifier AMP4 is supplied to the cathode of the diode D6.

The anodes of the diodes D3 to D6 are mutually connected and this common connection point is connected to the positive power line through the photodiode of a photocoupler PH1. When the voltage of one of the batteries B1 to B4 reaches a set voltage of, for example, 4.2 V, during constant-current charging, constant-voltage charging starts. During constant-voltage charging, the charging voltage is controlled by a reference voltage and the operational amplifier corresponding to the battery that first reaches a set voltage. Since variations between the voltages of batteries are increased as the number of batteries contained in a battery pack increases, application of the present embodiment is effective.

Figure 8:
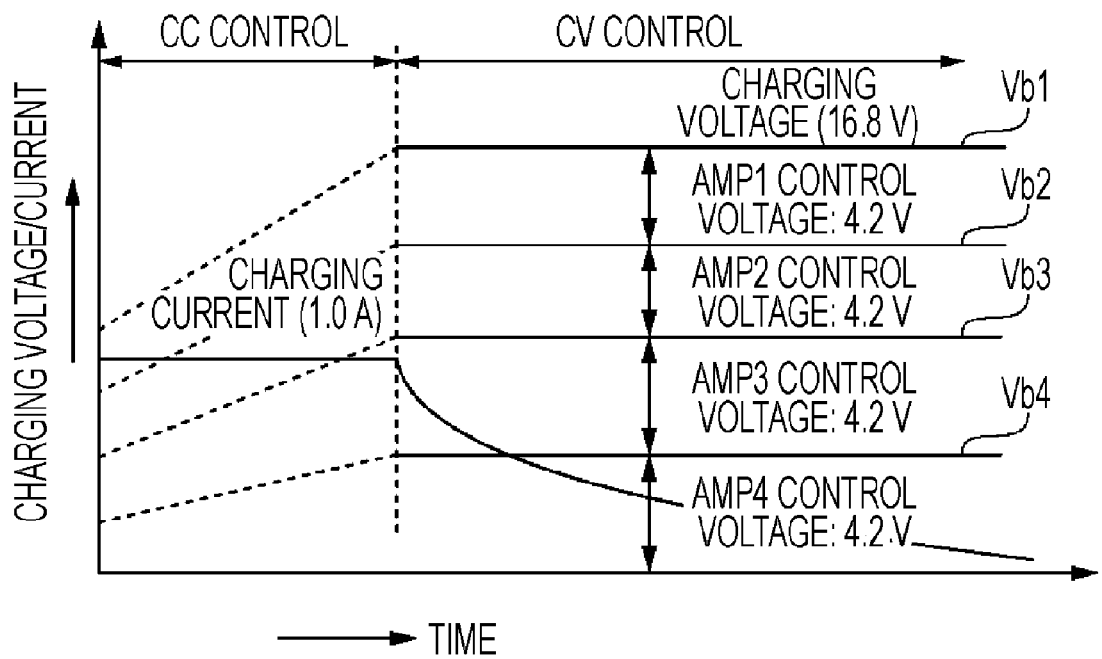
FIG. 8 is a line chart showing the output characteristic of a charging apparatus according to another embodiment.

FIG. 8 shows the output characteristic of a charging apparatus according to another embodiment, indicating changes in charging current and charging voltage over time. In this example, the voltage applied to each battery is adjusted to 4.2 V. The characteristics of the batteries B1 to B4 are indicated as Vb1 to Vb4, respectively.

As in the embodiment described above, the charging apparatus first performs constant-current (CC) charging with a constant current of, for example, 1.0 A after initial charging. In an initial charging mode, which is at an early stage of charging, charging is performed with an initial charging current If. The battery voltage (internal electromotive force) rises as charging progresses. The voltages of the batteries are compared with the reference voltages by the operational amplifiers AMP1 to AMP4, respectively.

Next, when the voltage of one of the batteries B1 to B4 reaches 4.2 V, the magnitude relationship between two input voltages of the operational amplifier connected to the battery is reversed and the low level is output and an output current is generated. After that, constant-voltage (CV) charging control is performed. It is assumed here that the balance between the voltages of the batteries B1 to B4 is lost. If the voltage of the battery B3 is higher than the voltages of the other batteries, when the battery voltage of the battery B3 first reaches 4.2 V as charging progresses, the output of the operational amplifier AMP3 goes low. The outputs of the other operational amplifiers remain high. Therefore, the output current of the operational amplifier AMP3 is fed back to a pulse width modulation control circuit 3 through the photocoupler PH1 and the battery voltage of the battery B3 is adjusted to 4.2 V.

The charging apparatus adjusts the battery voltage of the battery B3 to a constant voltage of 4.2 V in this way to prevent charging with a higher voltage (above the upper voltage limit). Since the battery voltages of the other batteries do not reach 4.2 V yet, as a result of control of the voltage of the battery B3, the charging voltages of the other batteries are surely adjusted to 4.2 V or lower to prevent the batteries from being charged to a voltage higher than the upper voltage limit.

4. MODIFICATION

The present application is not limited to the embodiments described above and various modifications may be made without departing from the scope of the invention. For example, a plurality of secondary batteries mutually separated may be used instead of a battery pack. As a power supply circuit for outputting charging voltage and charging current, a configuration other than those shown in the above embodiments may be used. In addition, a switching device such as a relay may be used instead of an FET.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A charging apparatus comprising:
a power supply circuit for converting alternating current input into direct current output;
a secondary battery including a plurality of batteries connected in series, the secondary battery being charged by an output voltage of the power supply circuit;
a charging control circuit that controls charging in a constant-current charging mode for charging the secondary battery with a constant current and, when a terminal voltage of the secondary battery reaches a predetermined voltage, switches the charging in the constant-current charging mode to charging in a constant-voltage charging mode for charging the secondary battery to a constant voltage; and
a plurality of voltage control circuits, each adjusting a voltage of each of the plurality of batteries to a set voltage;
wherein the plurality of voltage control circuits respectively detect rises in voltages of the plurality of batteries, and one of the voltage control circuits, first detecting attainment of the set voltage, performs subsequent voltage control.

2. The charging apparatus of claim 1 further comprising bidirectional switches and a plurality of voltage comparators;
wherein voltages of the plurality of batteries are supplied to the plurality of voltage comparators through the bidirectional switches that turn on during charging operation and turn off during non-charging operation;
reference voltages are supplied to the plurality of voltage comparators respectively;
a comparison output from one of the plurality of voltage comparators is supplied to the power supply circuit as an output voltage control signal; and
voltages of the plurality of batteries are adjusted to values according to the reference voltages.

3. The charging apparatus of claim 2, wherein each of the bidirectional switches comprises a first field-effect transistor and a second field-effect transistor, which are connected in series.

4. The charging apparatus of claim 1, wherein output signals from the plurality of voltage control circuits are supplied to a photodiode of a photocoupler through diodes.

5. The charging apparatus of claim 1, wherein the secondary battery is a battery pack including a plurality of batteries connected in series and an insulating outer case covering the batteries.

* * * * *